United States Patent
Duphiney

(10) Patent No.: US 9,674,324 B1
(45) Date of Patent: Jun. 6, 2017

(54) PHONE CASE WITH FINGER SLOTS

(71) Applicant: John Paul Duphiney, Howell, NJ (US)

(72) Inventor: John Paul Duphiney, Howell, NJ (US)

(*) Notice: Subject to any disclaimer, the term of this patent is extended or adjusted under 35 U.S.C. 154(b) by 0 days.

(21) Appl. No.: 15/168,322

(22) Filed: May 31, 2016

(51) Int. Cl.
*H04M 1/02* (2006.01)
*H04B 1/3888* (2015.01)

(52) U.S. Cl.
CPC ......... *H04M 1/0281* (2013.01); *H04B 1/3888* (2013.01)

(58) Field of Classification Search
CPC .................. H04B 1/3888; H04B 2001/3861
USPC ..... 455/575.8, 550.1, 575.1, 347, 90.1–90.3, 455/557; 379/433.01, 437, 440, 451
See application file for complete search history.

(56) References Cited

U.S. PATENT DOCUMENTS

| | | | |
|---|---|---|---|
| D651,205 S | 12/2011 | Soekoro | |
| 8,208,871 B2 | 6/2012 | Merz | |
| 8,428,664 B1 | 4/2013 | Wyers | |
| 8,480,144 B2 | 7/2013 | Potter | |
| 8,548,536 B1 | 10/2013 | Gunnip | |
| 9,198,307 B1 * | 11/2015 | Lacy | H05K 5/0086 |
| 9,407,743 B1 * | 8/2016 | Hirshberg | H04M 1/04 |
| 2011/0065486 A1 | 3/2011 | Bayrami | |
| 2012/0031937 A1 | 2/2012 | Baker | |
| 2014/0203159 A1 | 7/2014 | Muhammad | |
| 2015/0062787 A1 * | 3/2015 | Wilson | H04M 1/185 361/679.01 |
| 2015/0111621 A1 * | 4/2015 | Smith | H04B 1/3888 455/575.1 |

FOREIGN PATENT DOCUMENTS

WO    2014058633 A2    4/2014

* cited by examiner

*Primary Examiner* — Keith Ferguson
(74) *Attorney, Agent, or Firm* — Kyle A. Fletcher, Esq.

(57) ABSTRACT

The phone case with finger slots is a case that supports an electronic device, such as a smart phone. The case is further defined with a rear surface that includes at least one finger slot integrated therein. The at least one finger slot of the rear surface of the case includes a groove that is recessed below the rear surface of the case. The at least one finger slot includes an elastic member that spans across the groove. A finger opening is provided on a side surface of the case. In use, a finger is adapted to be inserted into the finger opening such that the elastic member stretches upwardly in order to form a contoured fitting over the finger. The case is also further defined with a top surface, and an electronic device is adapted to be inserted into a cavity provided through the top surface of the housing.

10 Claims, 3 Drawing Sheets

US 9,674,324 B1

PHONE CASE WITH FINGER SLOTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of smart phone or cell phone cases, more specifically, a case for an electronic device that has finger slots integrated into a rear surface.

SUMMARY OF INVENTION

The phone case with finger slots is a case that supports an electronic device, such as a smart phone. The case is further defined with a rear surface that includes at least one finger slot integrated therein. The at least one finger slot of the rear surface of the case includes a groove that is recessed below the rear surface of the case. The at least one finger slot includes an elastic member that spans across the groove. A finger opening is provided on a side surface of the case. In use, a finger is adapted to be inserted into the finger opening such that the elastic member stretches upwardly in order to form a contoured fitting over the finger. The case is also further defined with a top surface, and an electronic device is adapted to be inserted into a cavity provided through the top surface of the housing.

It is an object of the invention to provide a phone case with finger slots such that an end user is able to partially slide his or her fingers into the finger slots in order to secure the phone case to the hand of the end user.

These together with additional objects, features and advantages of the Phone case with finger slots will be readily apparent to those of ordinary skill in the art upon reading the following detailed description of the presently preferred, but nonetheless illustrative, embodiments when taken in conjunction with the accompanying drawings.

In this respect, before explaining the current embodiments of the Phone case with finger slots in detail, it is to be understood that the Phone case with finger slots is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the Phone case with finger slots.

It is therefore important that the claims be regarded as including such equivalent construction insofar as they do not depart from the spirit and scope of the Phone case with finger slots. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
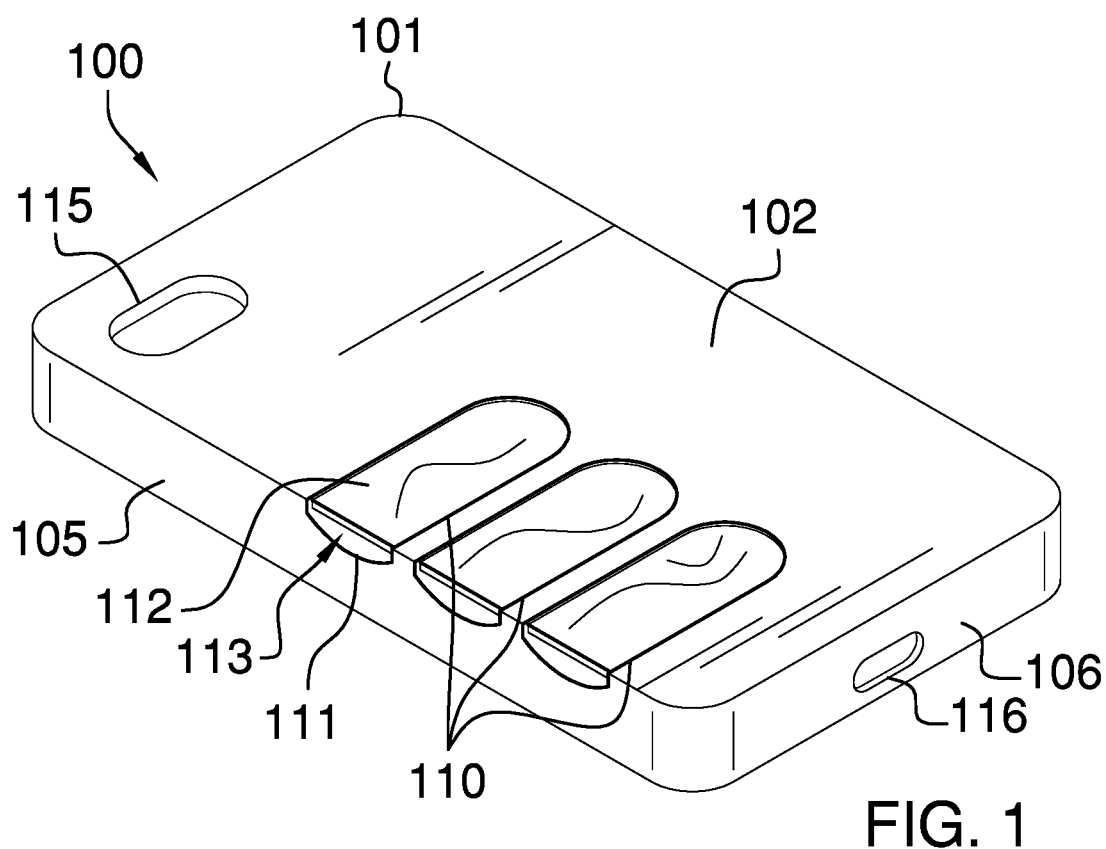
FIG. 1 is a rear, perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The Phone case with finger slots 100 (hereinafter invention) comprises a case 101 that is further defined with a rear surface 102, a front surface 103, and side surfaces 104. The side surfaces 104 are further defined with a first side surface 105, a second side surface 106, a third side surface 107, and a fourth side surface 108. The case 101 is made of a material comprising a plastic, metal, wood, carbon fiber composite, ceramic, or rubber.

The invention 100 is adapted to support an electronic device 200. Moreover, the term electronic device 200 is being used to loosely refer to a smart phone, cell phone, tablet computer, or other device that may benefit from a protective case. The front surface 103 includes an opening 109 into which the electronic device 200 is inserted and removed from the case 101.

Figure 2:
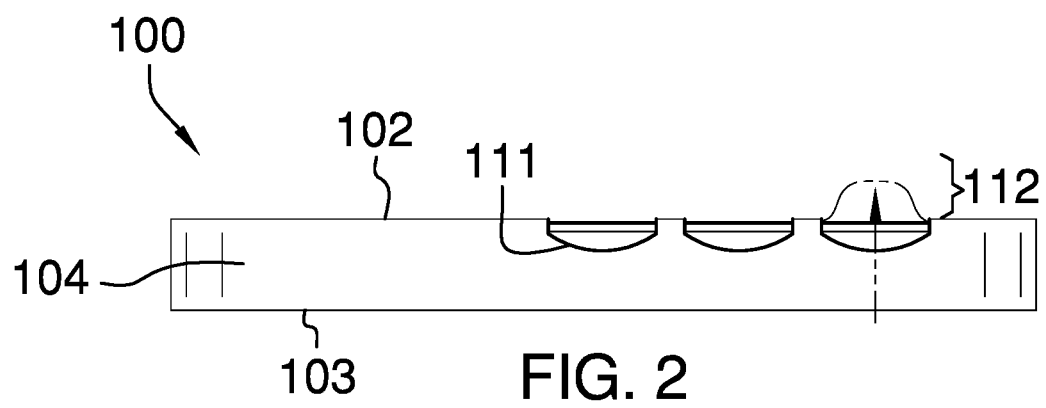
FIG. 2 is a side view of an embodiment of the disclosure.
Figure 3:
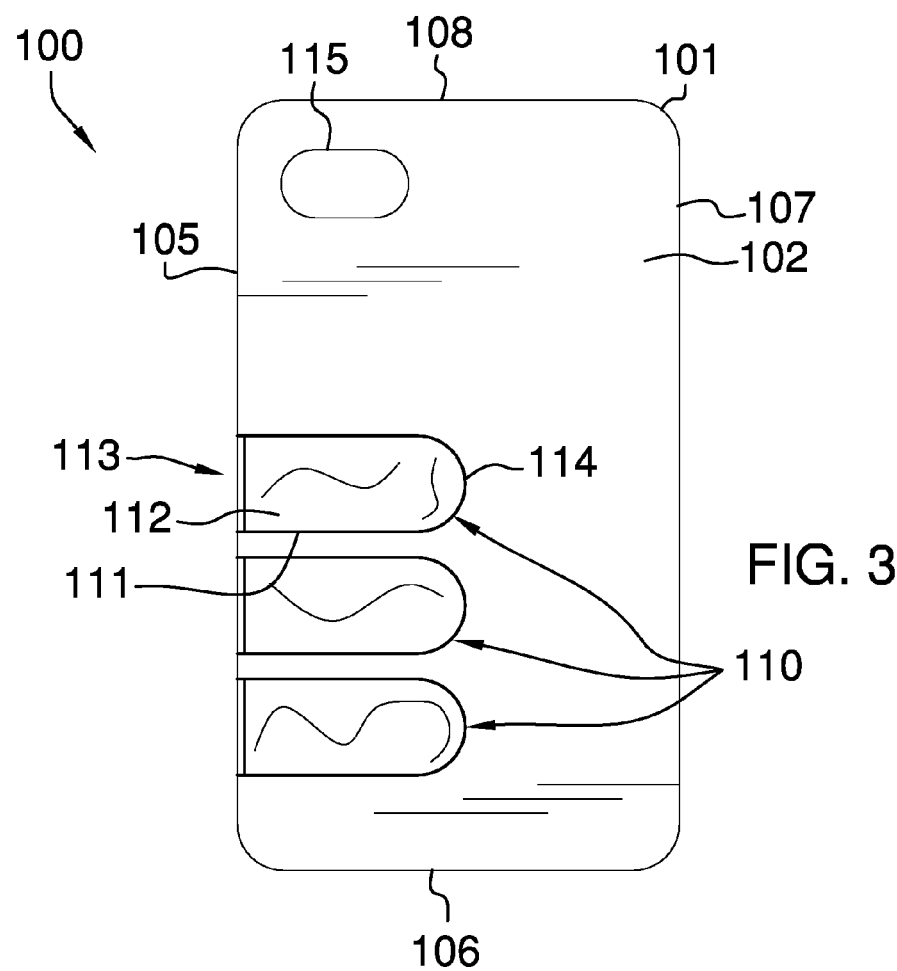
FIG. 3 is a bottom view of an embodiment of the disclosure.
Figure 4:
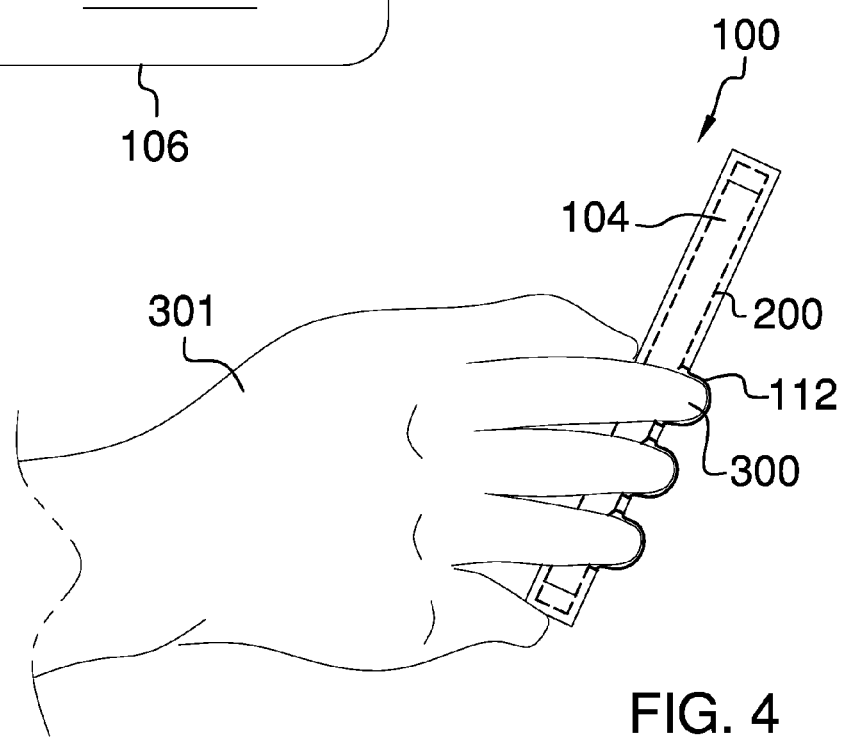
FIG. 4 is a perspective view of an embodiment of the disclosure in use.
Figure 5:
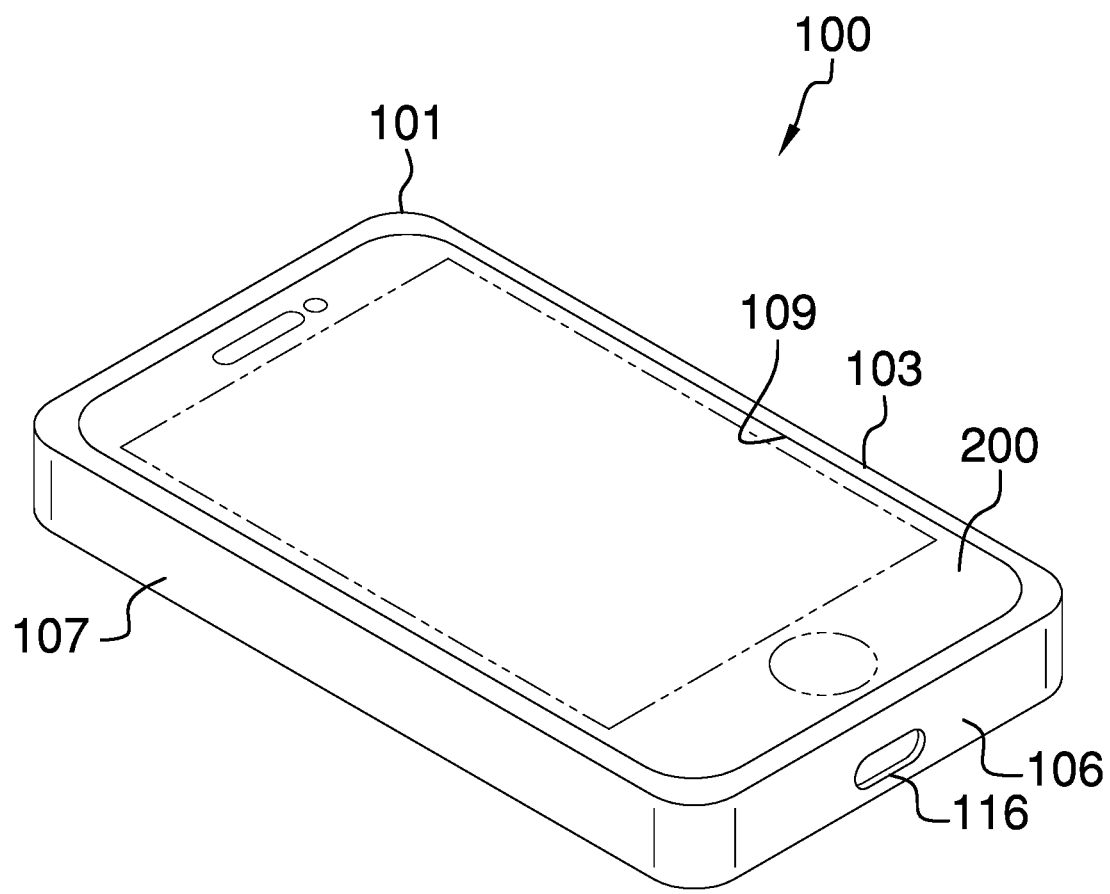
FIG. 5 is a top, perspective view of an embodiment of the disclosure in use.

The rear surface 102 includes at least one finger slot 110 thereon. The at least one finger slot 110 includes a groove 111 that is recessed below the rear surface 102 of the case 101. The at least one finger slot 110 includes an elastic member 112 that spans across the groove 111 to form a finger opening 113 on the side surface 104. Referring to FIGS. 1 and 2, the finger opening 113 is provided on the first side surface 105. The at least one finger slot 110 is provided on the rear surface 102 closest to the second side surface 106 so as to occupy a region of the case 101 associated with the rear surface 102, the first side surface 105 and the second side surface 106.

It shall be noted that the groove 111 of the rear surface 102 extends over to the first side surface 105. The elastic member 112 provided on the at least one finger slot 110 extends across an entire area of the groove 111 of the rear surface 102. It shall be noted that the figures depict three of the at least one finger slot 110. However, it is envisioned that one, two, three, or four of the at least one finger slot 110 may be provided in varying embodiments of the invention 100.

The elastic member 112 is ideally made of a rubber material or a flexible fabric such that the elastic member 112 may extend outwardly with respect to the rear surface 102. The finger opening 113 is adapted to receive a finger 300 of a hand 301. The at least one finger slot 110 is adapted to secure the invention 100 to the hand 301 when in use. Securing the invention 100 to the hand 301 aids in preventing dropping of the electronic device 200.

The grooves 111 and the elastic member 112 are further defined with a semi-circular end 114 that is distal from the finger opening 113. It shall be noted that the rear surface 102 may include a camera opening 115 to correspond with a camera provided on the electronic device 200, which is well known in the art. The second side surface 106 may include a plug opening 116 to correspond with a plug port of the electronic device 200, which is well known in the art.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device comprising:
a case with a rear surface with at least one finger slot thereon;
wherein said case is adapted to support an electronic device;
wherein the at least one finger slot is adapted to receive a finger in order to secure the case to a hand whilst providing access to and using said electronic device;
wherein the case is further defined with a front surface, and side surfaces;
wherein the front surface is opposite of the rear surface;
wherein the side surfaces is further defined with a first side surface, a second side surface, a third side surface, and a fourth side surface;
wherein the front surface includes an opening into which the electronic device is inserted and removed from the case;
wherein the rear surface includes the at least one finger slot thereon; wherein the at least one finger slot includes a groove that is recessed below the rear surface of the case;
wherein the at least one finger slot includes an elastic member that spans across the groove to form a finger opening on the side surface;
wherein the finger opening of the at least one finger slot is provided on the first side surface;
wherein the at least one finger slot is provided on the rear surface closest to the second side surface so as to occupy a region of the case associated with the rear surface, the first side surface and the second side surface.

2. The device according to claim 1 wherein the groove of the rear surface extends over to the first side surface.

3. The device according to claim 2 wherein the elastic member provided on the at least one finger slot extends across an entire area of the groove of the rear surface.

4. The device according to claim 3 wherein the elastic member is made of a flexible material such that the elastic member is able to extend outwardly with respect to the rear surface of the case; wherein the finger opening is adapted to receive the finger of the hand.

5. The device according to claim 4 wherein the grooves and the elastic member are further defined with a semi-circular end that is distal from the finger opening.

6. The device according to claim 5 wherein the rear surface includes a camera opening to correspond with a camera provided on the electronic device.

7. The device according to claim 6 wherein the second side surface includes a plug opening to correspond with a plug port of the electronic device.

8. A device comprising:
a case with a rear surface with at least one finger slot thereon;
wherein said case is adapted to support an electronic device;
wherein the at least one finger slot is adapted to receive a finger in order to secure the case to a hand whilst providing access to and using said electronic device;
wherein the case is further defined with a front surface, and side surfaces;
wherein the front surface is opposite of the rear surface;
wherein the side surfaces is further defined with a first side surface, a second side surface, a third side surface, and a fourth side surface;
wherein the front surface includes an opening into which the electronic device is inserted and removed from the case;
wherein the rear surface includes a camera opening to correspond with a camera provided on the electronic device;
wherein the second side surface includes a plug opening to correspond with a plug port of the electronic device;
wherein the rear surface includes the at least one finger slot thereon; wherein the at least one finger slot includes a groove that is recessed below the rear surface of the case; wherein the at least one finger slot includes an elastic member that spans across the groove to form a finger opening on the side surface;
wherein the finger opening of the at least one finger slot is provided on the first side surface; wherein the at least one finger slot is provided on the rear surface closest to the second side surface so as to occupy a region of the case associated with the rear surface, the first side surface and the second side surface.

9. The device according to claim 8 wherein the groove of the rear surface extends over to the first side surface; wherein the elastic member provided on the at least one finger slot extends across an entire area of the groove of the rear surface.

10. The device according to claim 9 wherein the elastic member is made of a flexible material such that the elastic member is able to extend outwardly with respect to the rear surface of the case; wherein the finger opening is adapted to receive the finger of the hand; wherein the grooves and the elastic member are further defined with a semi-circular end that is distal from the finger opening.

\* \* \* \* \*